United States Patent [19]

Dumas et al.

[11] Patent Number: 4,978,496
[45] Date of Patent: Dec. 18, 1990

[54] ARRANGEMENT TO PREVENT THE MOLTEN CORE OF A NUCLEAR REACTOR FROM PENETRATING INTO THE GROUND

[75] Inventors: Daniel Dumas, St. Priest; George Hoynant, Breral, both of France

[73] Assignee: Societe Des Electrodes & Refractaires Savoie, Courbevoie, France

[21] Appl. No.: 327,802

[22] PCT Filed: Jun. 9, 1988

[86] PCT No.: PCT/FR88/00293
  § 371 Date: Feb. 6, 1989
  § 102(e) Date: Feb. 6, 1989

[87] PCT Pub. No.: WO88/09998
  PCT Pub. Date: Dec. 15, 1988

[30] Foreign Application Priority Data

Jun. 11, 1987 [FR] France ............................... 87 08748

[51] Int. Cl.⁵ .............................................. G21C 13/10
[52] U.S. Cl. .................................................. 376/280
[58] Field of Search .......................................... 376/280

[56] References Cited

U.S. PATENT DOCUMENTS

| | | | |
|---|---|---|---|
| 3,677,892 | 7/1972 | Schabert | 376/280 |
| 4,036,688 | 7/1972 | Golden et al. | 376/280 |
| 4,072,561 | 2/1978 | Friedrich | 376/280 |
| 4,073,682 | 2/1978 | Barleon et al. | 376/280 |
| 4,121,970 | 10/1978 | Albrecht et al. | 376/280 |
| 4,146,429 | 3/1979 | Slagley | 376/280 |

FOREIGN PATENT DOCUMENTS

| | | | |
|---|---|---|---|
| 2363845 | 6/1975 | Fed. Rep. of Germany . | |
| 2557884 | 6/1977 | Fed. Rep. of Germany | 376/280 |
| 2625357 | 12/1977 | Fed. Rep. of Germany | 376/280 |
| 2336772 | 7/1977 | France . | |
| 2030347 | 4/1980 | United Kingdom . | |

*Primary Examiner*—Daniel D. Wasil
*Attorney, Agent, or Firm*—Dennison, Meserole, Pollack & Scheiner

[57] ABSTRACT

An arrangement is disclosed for preventing the molten corium of a nuclear reactor from penetrating into the ground. The reactor is supported by a concrete raft bearing on the ground, and inserted in the raft is a retaining basin having an upper portion of refractory material which is chemically inert towards the constituents of the corium oriented toward the corium, and a lower portion made of a refractory material with a heat conductivity much greater than that of the upper portion. Generally the upper layer of the retaining basin will be made of zirconia and the lower layer will be made of graphite. Disposed between the reactor and the retaining basin is a means for deflecting the vertical attack of corium on the basin and spreading out the corium, comprising a plurality of concentric cavities, each successive cavity having a greater outer diameter than that of the preceding cavity and having a center located at a greater vertical distance from the reactor than the preceding cavity.

8 Claims, 2 Drawing Sheets

ARRANGEMENT TO PREVENT THE MOLTEN CORE OF A NUCLEAR REACTOR FROM PENETRATING INTO THE GROUND

TECHNICAL FIELD OF INVENTION

The invention concerns an arrangement to prevent the molten core of a nuclear reactor penetrating into the ground, particularly when the reactor has gone out of control and been mothballed.

STATE OF THE ART

To clarify the invention it will be recalled that a nuclear reactor operating by uranium fission generally comprises (FIG. 3) a core 1 containing the reactor proper, arranged inside a concrete vault 2. The vault is itself enclosed in another vault 3 known as the containment vault, which is also made of concrete and has a base 4 known as a "raft", which is 4 to 5 meters thick and generally supported on piles so as to form an antiseismic assembly.

Recent occurrences at nuclear power stations have shown that risks of major accidents which may lead to fusion of the core are a possibility. In such cases, and particularly in power stations of the type installed in France, the system with a double shield and filters enables the radioactive emanations to be confined inside the vault. On the other hand it is virtually certain that the fused mass of the corium cannot be stopped, with all the risks that this implies to the strength of the safety and containment infrastructure and above all to the ground water table.

After any occurrence leading to the destruction of the core of a reactor one is left with a fused mass essentially made up of:
 an oxide phase, which has energy since it contains fission products, chiefly comprising uranium oxide and zirconium oxide,
 and a metal phase chiefly comprising steel, zircaloy, chromium and various other metals.

This mass, which is described as "corium", has a vast amount of energy and after a day or two will still have a residual output of approximately 10 to 15 MW, in the case of a reactor with an initial output of approximately 1000 MW, and a temperature estimated at about 2000° C., due to the radioactivity of some elements and the exothermic reactions which take place as the concrete decomposes.

The fused mass attacks and decomposes the concrete of the raft, and it is thought that the attacking speed after a few hours would be a few centimeters per hour. After a few days the corium would pass inexorably through the concrete of the substructure of the raft and right into the substratum.

Furthermore, as soon as the corium has passed through the raft the containment vault is no longer sealed and radioactive gases may escape.

DESCRIPTION OF PROBLEM

Considering the dangers created by a reactor which has gone out of control, it is necessary to find a means for stopping the corium before it reaches the substratum, thus avoiding the major risks involved in pollution of the substratum and atmosphere due to the leakage.

An arrangement of this type must have the following dual function.
 In contact with the corium, it must be refractory and chemically inert vis a vis the above-mentioned constituents, to temperatures of approximately 2000° to 2500° C.;
 It must dissipate the residual thermal flux generated by the corium and lower the temperature of the corium-refractory interface.

The inert refractory material must further be associated with cooling circuits designed and dimensioned to dissipate the thermal flux thus transferred.

At the present time no one material is known which can carry out both functions and which has high heat conductivity within the temperature range in question. The two functions must therefore be separated and each carried out by a suitable material.

French patent application Ser. No. FR 2336772 describes a protective coating for the safety pit of a nuclear reactor, comprising a layer of material with a high melting point, such as thorium dioxide or uranium dioxide, characterized in that it comprises, under a layer of this non-fusible material, a lower layer of a material with good heat conductivity such as graphite. However, the arrangement is directly exposed to the descent of the molten corium, in cases where the reactor has been moth balled, and the corium, which has still not spread out (as shown in FIG. 1) and is still at a temperature of over 2000° C., is in danger of rapidly destroying the central part of the retaining basin and continuing its descent in an uncontrolled manner.

OBJECT OF INVENTION

In view of the above, the means for preventing the molten core of a nuclear reactor penetrating into the ground, which is the object of this invention, would appear to comprise a circular basin of highly conductive graphite resting on appropriate cooling systems. The inner surface of the basin will be covered with a layer of zirconia of a thickness calculated to let the graphite work within the optimum temperature range. The basin will be inserted in the center of the raft so that it blocks the corium within the raft, while keeping the raft sealed. Means will further be provided to make the molten corium spread out before it reaches the level of the retaining basin, so that most of its surface comes into contact with the refractory cladding.

More specifically, the object of the invention is an arrangement to prevent the molten corium of a nuclear reactor from penetrating into the ground, the reactor being supported by a concrete raft bearing on the ground and supporting a retaining basin of which the upper portion, in contact with the molten corium, is made of a material which is refractory and chemically inert vis a vis the constituents of the corium, comprising either zirconia or thoria at a thickness of approximately 2 to 10 cm, and the lower portion is made of a material which is refractory and a good conductor of heat such as graphite, associated with a cooling circuit which operates by circulating a fluid, characterized in that the basin is inserted in the concrete raft, and that the raft has means for deflecting the lateral attack by the molten corium, thus making the corium spread out over an area substantially equal to that of the basin when it reaches that level.

The deflecting means may comprise a plurality of concentric cavities formed in the raft above the basin and arranged one above the other, each cavity having an outside diameter larger than the cavity immediately above it.

The retaining basin is preferably inserted substantially half way up the height of the raft; its upper portion initially slows down the descent of the corium and makes it spread out laterally, while the lower portion remains intact and continues to keep the vault confining the reactor sealed. The lower portion cooperates with cooling means known per se to dissipate the thermal flux received by the retaining basin. The invention is illustrated in FIGS. 1 to 5.

Figure 3:
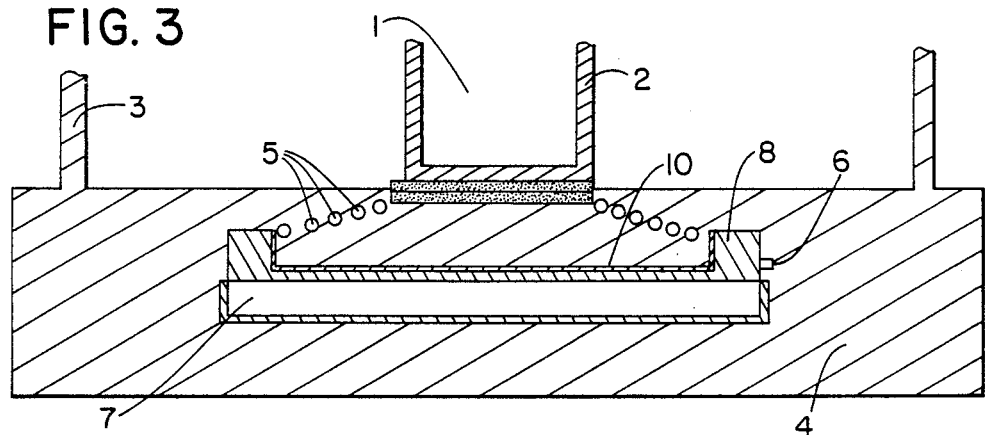

FIG. 3 is a highly simplified cross-section through the lower part of a reactor 1 fitted with the retaining basin according to the invention, with cavities 5 to encourage the lateral attack and means 7 for cooling the trough. The reactor vault 2 and containment vault 3 are also shown.

Figure 4:
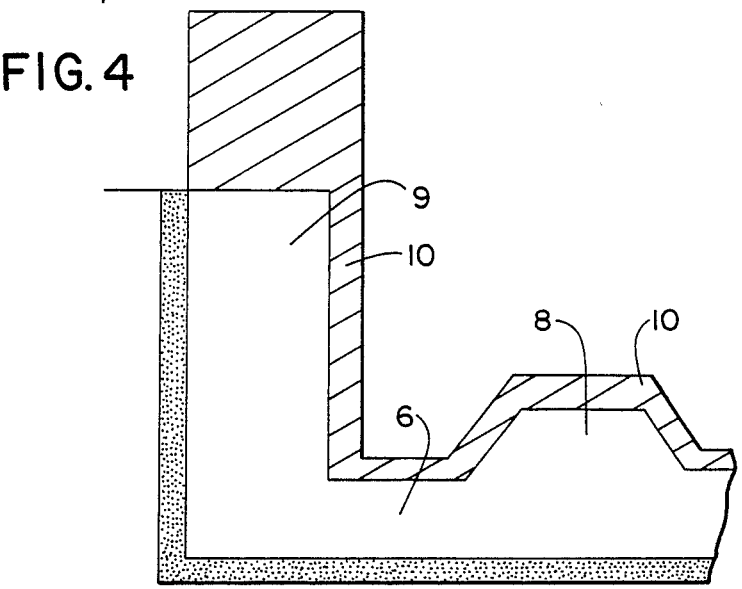

FIG. 4 is a different embodiment where the retaining basin 6 has a rib 8 to increase its total area and thus the admissible heat flux.

Figure 5:
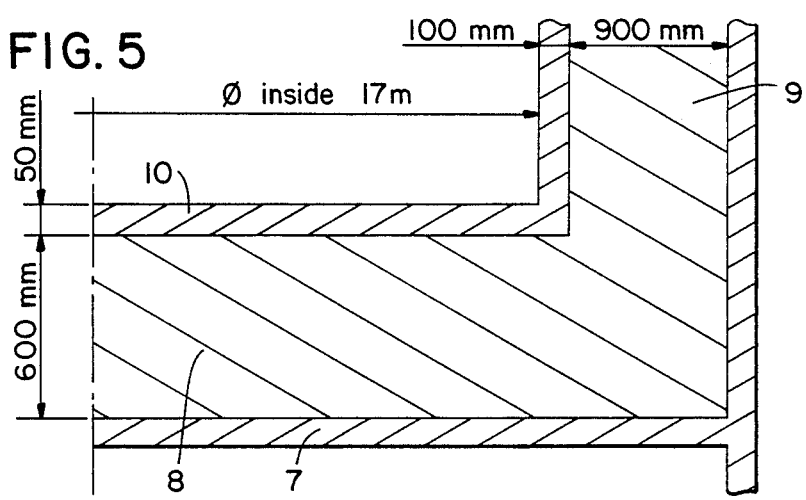

FIG. 5 shows a detail of the basin 6, with the graphite part 8, the zirconia cladding 10, the side edge 9 on which the zirconia cladding has been made thicker, and the position of the cooling system 7.

We shall first consider the problem of the thermal flux to be dissipated:

The law governing the flow of a thermal flux in steady state condition through a flat wall of material i is given by the following equation (Fourier's law)

$$\phi = \frac{\lambda_i S [T_{2,i} - T_{1,i}]}{e_i}$$

wherein:

$\phi$ is the thermal flux
$\lambda_i$ the heat conductivity of the material
S the contact area
$e_i$ the thickness of the material i
$T_{2,i}$ the temperature of the hot surface of the material i
$T_{1,i}$ the temperature of the cold surface of the material i So it will be noted that the flux dissipated will increase with the heat conductivity of the material i and the area of contact (corium-refractory).

We shall now try to resolve the first function which falls to the protective system: the refractory material must be chemically perfectly inert vis a vis oxides, particularly uranium oxide, up to temperatures of approximately 2500° C.; zirconia (melting point 2650° C.) fulfils these conditions. On the other hand zirconia has relatively poor heat conductivity (about 3 W/m.K.), so it cannot be used alone in a thick slice since it would slow down dissipation of the thermal flux. Thoria $ThO_2$ may equally be suitable except for its high price. Its heat conductivity, which varies with temperature, is 2 to 3 times better than that of zirconia.

Hence the solution is to have a system wheres the first function is carried out by a thin layer of zirconia, approximately 2 to 10 cm thick.

Figure 1:
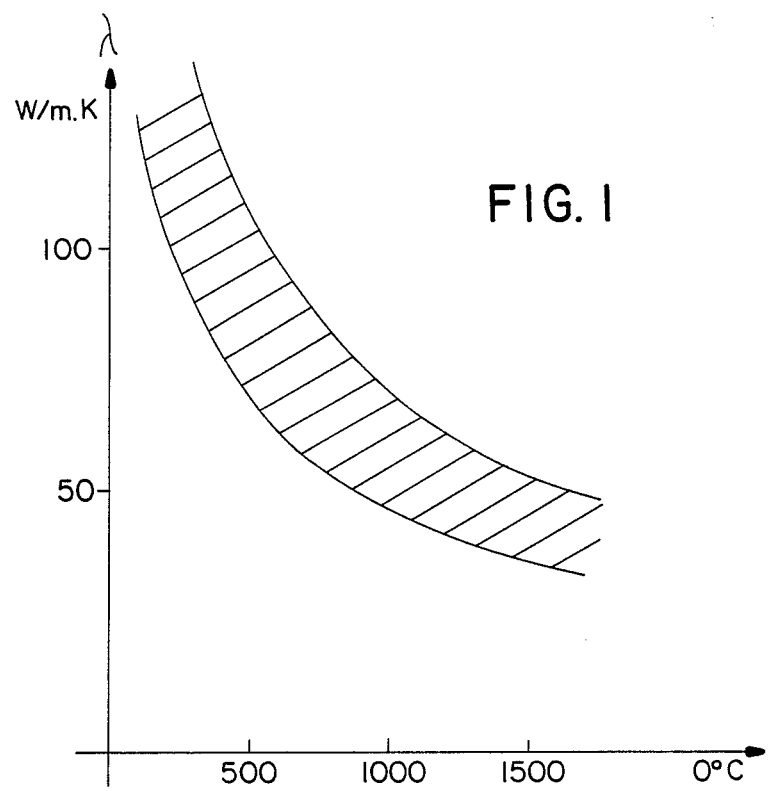
FIG. 1 shows the range (hatched) within which graphites have mean heat conductivity (in W/m.K.) as a function of temperature.

The second function is to dissipate heat. The refractory material perfectly adapted to this function is graphite, provided that it operates within low temperature ranges, since its heat conductivity decreases with temperature (see FIG. 1). There is therefore every reason to keep its interface with the zirconia at a temperature below 300° C. It is further desirable for the heat conductivity of the material forming the lower portion to be at least 15 times that of the material forming the upper portion, which should preferably be from 1 to 15 W/m.K. This is the case with graphite.

We shall now consider the problem of the surface area (parameter S in the Fourier formula):

We have made thermal calculations by modeling to see to what extent our system can be put inside a nuclear reactor, taking into account its geometry.

The core 1 of a reactor is generally about 5 meters in diameter. If the core of the reactor is put inside the basin and if the flux to be dissipated is 15 MW, the temperature in the zirconia layer will be found to be about 6000° K. Hence the basin should be located so that the area of contact between the corium and the zirconia is larger than that corresponding to a diameter of 5 meters (see Example 1).

Given that the temperature of the corium-zirconia interface has to be kept at about 1500° C., the calculation shows that the basin must have a diameter of about 14 to 15 meters (Examples 2 and 3).

Under these conditions a zirconia layer about 5 cm thick is sufficient to allow the graphite to operate under favorable thermal conditions.

Let us suppose that the corium is confined in the configuration in question (with the core of the reactor 5 meters in diameter) in such a way that it preferentially starts passing through the raft. It is initially in contact with the concrete over an area corresponding to a diameter of 5 to 6 meters. As it passes through the raft (FIG. 2) the molten corium attacks the concrete in depth and laterally. In the lateral direction the attack stops when the concrete is no longer in contact with the corium due to its gradual penetration into the raft; lateral penetration, at the level of the attacking front, increases as the corium spreads out widthwise. According to its temperature the corium is either in a liquid state or in a pasty state with relatively low viscosity, enabling it to fill all the accessible space at the attacking front. Consequently its height diminishes and its front surface increases as it gradually descends. As the attack on the raft progresses it will thus widen out at a certain angle. There is therefore an interest in having the angle of attack as large as possible (relative to the vertical), so that the retaining basin can be built in relatively close to the surface of the raft. This makes it possible to keep a thick enough portion of intact raft below the retaining basin for it to carry out its three essential functions for very many years after accidental destruction of the reactor, without the initial thickness of the raft having to be increased prohibitively; the three essential functions being imperviousness to liquids and radioactive gas, mechanical strength and integrity of the whole structure and anti-seismic resistance.

There is another requirement relating to the position of the retaining basin in the raft: as the molten corium gradually descends and spreads out in the concrete raft, the energy produced by the corium progressively decreases, e.g. from 30 to 40 MW, asymptotically reaching a value of e.g. about 15 MW, corresponding to the decaying energy of intermediate and long life radioactive elements. Thus it is desirable for the corium only to reach the retaining basin when its energy has dropped to near this asymptotic power limit. By model-ling this phenomenon an optimum concrete thickness of 2 to 3 meters has been found to reconcile the various requirements just set out. For example, if the raft has, an initial thickness of 5 meters and the retaining basis is under 3 meters of raft, there will be nearly 2 meters of intact raft left to carry out the functions described.

Figure 2:
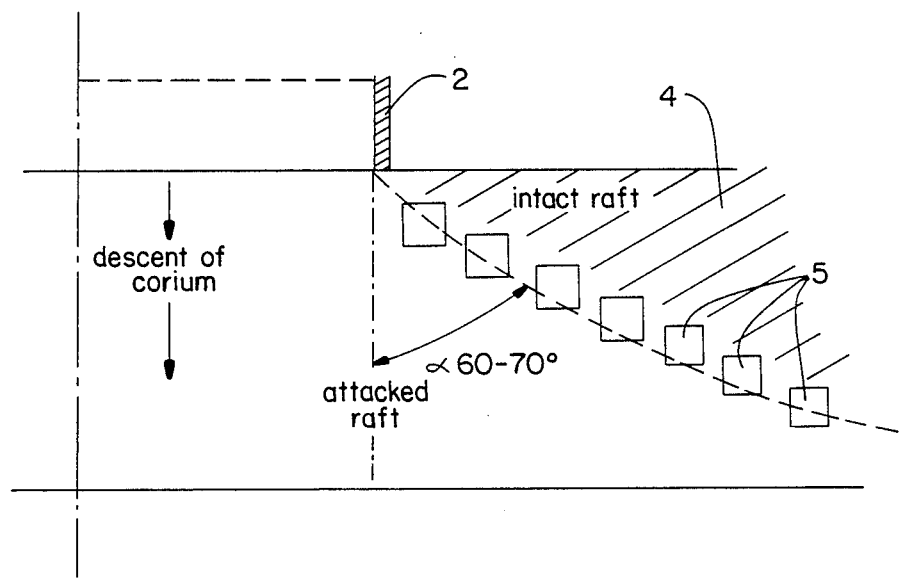
FIG. 2 shows how the lateral attack on the concrete raft 4 progresses as the corium descends, and the means for encouraging the lateral attack with a series of appropriately located cavities 5.

This arrangement can be improved by incorporating appropriate deflecting systems to increase the range of the lateral attack on the raft. The deflecting systems may comprise a plurality of concentric cavities formed in the raft above the basin 6 and arranged one above the other, each cavity having a diameter larger than the cavity immediately above it. The angle of splay α formed by the group of concentric cavities is from 45° to 70° and preferably from 60° to 70°. The angle may also increase progressively in a downward direction as shown in FIG. 2.

This widening of the front along which the raft is attacked (FIG. 2) enables the basin 6 to be arranged under only 2 meters of raft instead of 3, if the angle of attack α is about 60° to 70° (to the vertical).

The system for confining vertical penetration by the corium is shown in FIG. 3. The cooling system 7 has been indicated in a simple way as it is not part of the invention proper (circulation of fluid or heat transfer media for example).

A system of this type will stop vertical penetration. It will avoid pollution of the substratum and keep radioactive vapors in a confined space.

FIG. 4 shows a means of increasing the area of basin in contact with the corium, by means of one or more concentric ribs 8, also covered with zirconia 10.

FIG. 5 is a detail showing a way of arranging the containment basin 6. The geometry of the whole unit must in fact enable the whole reactor structure to be held together although the central part has disappeared. Hence there is every reason to increase the area of contact between corium and refractory material, while reducing the diameter of the basin if possible. In addition the unit must be adapted to the volumer of corium. The mass of corium has a volume of 30 to 40 cubic meters, i.e. a height of about 20 cm where the basin is 15 meters in diameter. Laterally, this corresponds to about 5% of the contact area involved in the passage of the thermal flux and enables the dimensions of the basin to be reduced accordingly.

In the FIG. 5 embodiment the graphite portion is 600 mm thick and is fitted with an edge 9 and a zirconia cladding 10. The zirconia is 50 mm thick in horizontal portion and 100 mm over the edge 9. The lower surface of the graphite portion 8 is in contact with an unspecified cooling means 7 (circulation of fluids, heat transfer media etc.).

EXAMPLES

These are given on the following hypotheses:
initial heat output of reactor 2700 MW
retaining basin comprising graphite 600 mm thick covered with a zirconia layer 50 mm thick
conductivity of graphite 200 W/m.K. in a horizontal direction and 170 W/m.K. in a vertical direction, due to the anisotropy of the material
heat conductivity of the zirconia 3 W/m.K.
cooling system giving a temperature of 50° C. below the graphite layer
thermal flux to be dissipated: 15 MW
melting temperature of the corium: approximately 1500° C.

EXAMPLE 1 (comparative)

The protective cladding is as shown in FIG. 5 with a diameter of 5 meters (substantially equal to that of the core of the reactor). It is arranged above the retaining basin which has a layer of zirconia. Thermal calculation shows that a system of this type can only dissipate 1.2 MW, which is quite inadequate. The (calculated) temperature at mid height in the zirconium layer is 5000° C. Hence there is no protection; this arrangement does not fulfill the set conditions.

EXAMPLE 2 (according to the invention)

There is a protective cladding as shown in FIG. 5, 15 meters in diameter. When the corium has come into contact with the zirconia layer over the whole area of the retaining basin, and where the flux to be dissipated is 15 MW, the mean temperature of the zirconia at the center of the basin is about 1000° C., the temperature of the corium-zirconia interface is 1500° C. and the temperature of the zirconia-graphite interface is approximately 330° C. This interface temperature is a little too high and puts the graphite into an unfavorable heat conductivity range (see FIG. 1); but the corium is nevertheless held in the basin.

EXAMPLE 3

The protective shrouding (retaining basins) as in FIG. 5 is brought to 17 meters in diameter.

When the corium has come into contact with the zirconia layer over the whole area of the retaining basin, and when the flux to be dissipated is 15 MW, the mean temperature of the zirconia at the center of the basin is about 810° C., the temperature of the corium-zirconia interface is 1500° C. and the temperature of the zirconia-graphite interface is approximately 250° C. This interface temperature is correct and puts the graphite within a favorable heat conductivity range; the purpose of the invention is thus achieved and penetration of the corium into the raft is stopped with a very good safety margin.

What is claimed is:

1. A means for preventing the molten corium of a nuclear reactor from penetrating into the ground, comprising:
a concrete raft bearing on the ground and supporting the reactor including a core portion bearing on said raft;
a retaining basin located within said raft, having a greater surface area than the core portion of the reactor bearing on the raft, and having an upper layer oriented toward the reactor comprising a refractory layer of zirconia or thoria at a thickness of about 2 to 10 cm, which is chemically inert toward the corium and a lower layer oriented away from the reactor and formed of a refractory material which is a good conductor of heat, said lower layer having an upper surface oriented toward the upper layer;
a cooling circuit associated with said lower layer and operating by circulation of fluid; and
means for defecting molten corium in vertical travel and causing the molten corium to spread out to the greater surface area of the retaining basin, said means comprising a plurality of horizontally oriented concentric cavities located in the raft between the reactor and the basin, each successive cavity having an outer diameter greater than the outer diameter of the previous cavity and having a center located at a greater vertical distance from the reactor than that of the previous cavity.

2. The means of claim 1, wherein said refractory material comprises graphite.

3. The means of claim 1, wherein said basin is located at substantially half-way up the height of said raft.

4. The means of claim 1, 2 or 3, wherein said plurality of concentric cavities forms a splay angle of about 45° to 70° to the vertical.

5. The means of claim 1, 2 or 3, wherein said basin includes at least one rib to increase its upper surface area.

6. The means of claim 1, 2 or 3, wherein said basin includes a side edge of a height above the upper surface of said basin which enables confinement of corium within said basin.

7. The means of claim 1, 2 or 3, wherein said basin has a diameter and a heat conductivity which enables the upper surface of the refractory material to be kept at a temperature below about 300° C. while the upper layer is in contact with molten corium.

8. The means of claim 1, 2 or 3, wherein said lower layer has a heat conductivity at least 15 times that of said upper layer.

* * * * *

UNITED STATES PATENT AND TRADEMARK OFFICE
CERTIFICATE OF CORRECTION

PATENT NO. : 4,978,496
DATED : December 18, 1990
INVENTOR(S) : Daniel DUMAS; George HOYNANT It is certified that error appears in the above-identified patent and that said Letters Patent is hereby corrected as shown below:

Column 3, line 36, please rewrite the formula as follows:

$$\Phi = \frac{\lambda i S [T_{2,i} - T_{1,i}]}{e_i}$$

Column 3, line 46, please change "$T_{1,1}$" to --$T_{1,i}$--.

Signed and Sealed this

Fourth Day of June, 1991

Attest:

HARRY F. MANBECK, JR.

*Attesting Officer*     *Commissioner of Patents and Trademarks*